United States Patent [19]
Espie et al.

[11] Patent Number: 5,282,082
[45] Date of Patent: Jan. 25, 1994

[54] DAY-AND-NIGHT OPTICAL OBSERVATION DEVICE

[75] Inventors: Jean-Luc Espie, Paris; Gilbert Poulon, Chambeon, both of France

[73] Assignee: Thomson TRT Defense, Paris, France

[21] Appl. No.: 733,663

[22] Filed: Jul. 22, 1991

[30] Foreign Application Priority Data

Jul. 31, 1990 [FR] France .................. 90 09741

[51] Int. Cl.$^5$ .................................... G02B 23/00
[52] U.S. Cl. ............................ 359/353; 359/399; 359/409; 359/419
[58] Field of Search ............. 356/153, 142, 253–255; 359/350–353, 399–420, 629, 630, 425–431, 811–822, 503–506; 33/233; 250/213 VT; 89/41.06, 41.19, 41.22

[56] References Cited

U.S. PATENT DOCUMENTS

| | | | |
|---|---|---|---|
| 3,407,302 | 10/1968 | Bouwers | 359/403 |
| 3,529,882 | 9/1970 | Schmidt | 359/353 |
| 3,712,702 | 1/1973 | Schmidt | 359/419 |
| 4,758,076 | 7/1988 | Loy et al. | 359/403 |
| 4,861,996 | 8/1989 | Roth et al. | 356/153 |
| 5,084,780 | 1/1992 | Phillips | 359/419 |
| 5,140,151 | 8/1992 | Weiner et al. | 359/419 |

FOREIGN PATENT DOCUMENTS

| | | |
|---|---|---|
| 2054387 | 5/1972 | Fed. Rep. of Germany . |
| 2704185 | 3/1978 | Fed. Rep. of Germany . |
| 8605281 | 9/1986 | World Int. Prop. O. . |
| 8904008 | 5/1989 | World Int. Prop. O. . |

*Primary Examiner*—Bruce Y. Arnold
*Assistant Examiner*—Thong Nguyen
*Attorney, Agent, or Firm*—Pollock, VandeSande & Priddy

[57] ABSTRACT

A binocular-type optical device for night as well as day vision. A night vision optical device is located in a central body. The night vision optical device includes an optical path which is folded through a pair of opposed holes in a central body containing the night vision device. Two lateral bodies are affixed to the central body, each lateral body having a hole facing the holes in the central body. One of the lateral bodies faces an oblong hole in the central body, and is rotatable with respect to the central body. Each of the lateral bodies includes a day vision optical system having an objective at one end and an eyepiece at another end. A mirror contained in each lateral body are adjustable to permit either the folded night vision optical path or the day vision optical path to be received by a pair of common eyepieces.

7 Claims, 3 Drawing Sheets

DAY-AND-NIGHT OPTICAL OBSERVATION DEVICE

BACKGROUND OF THE INVENTION

1. Field of the Invention

An object of the present invention is a binocular-type device enabling observation by day as well as by night.

2. Description of the Prior Art

At present, there are a certain number of daytime binoculars that display qualities of compactness through the use of Porro prisms of the first and second species, or else Péchan-Schmidt prisms.

In the same way, there are night vision binoculars, comprising one or two image intensifier tubes, enabling vision with an enlargement of 1 for driving, pathfinding or night tasks, or greater enlargement for night observation.

The combination of these two functions in a single piece of equipment would have obvious advantages for a military person since he has to carry a large number of instruments that hamper his mobility.

However, this would be true only if this day-and-night vision equipment were to offer a gain in weight and space factor a compared with two separate pieces of equipment, and if each of these combined functions were to retain a level of efficiency comparable to that of currently available equipment.

The present invention relates to a system such as this which, through a novel mechanical optical device, can be used to combine daytime and night observation in one and the same compact and light piece of equipment that meets every requisite military constraint (mechanical resistance, impermeability etc.) through a combination between a bi-objective daytime system associated with a mono-objective system for night vision, the two systems cooperating respectively with a binocular system.

SUMMARY OF THE INVENTION

The device that is an object of the invention comprises:
standard optical means enabling daytime vision, comprising:
2 objectives,
2 image rectifying prisms,
2 eyepieces (common with the optical means enabling night vision);
standard optical means enabling night observation, comprising:
1 objective forming the image of the surrounding scene on the photocathode of the intensifier tube,
1 intensifier tube,
1 collimator, giving an image of the screen of the intensifier tube at infinity or at a few tens of centimeters,
2 central deflecting mirrors designed to separate the beams emerging from the collimator into two beams,
2 focusing units forming the image of the screen of the intensifier tube in the focal plane of the eyepieces,
2 lateral deflecting mirrors designed to deflect the beams along the axis of the eyepieces
2 eyepieces, (common with the optical means enabling daytime vision);
mechanical switching means enabling the change from daytime observation to night observation and vice versa, and mechanical means for focusing adjustment and for inter-pupil adjustment.

According to a preferred embodiment of the invention, the day-and-night optical observation device is constituted by a central body comprising two lateral holes, substantially facing each other, one of the holes having a substantially circular shape in projection, cooperating, in superimposition, with a hole of a corresponding shape made in a lateral body fixedly joined to the central body, while the other, oblong hole of the central body cooperates with a circular hole made on a lateral body mounted rotationally on said central body.

Said central body encloses the night objective, the intensifier tube and the collimator while each lateral body has a daytime objective, a rectifying prism, an eyepiece common to night vision and to daytime vision, a lateral deflecting mirror, a focusing unit and a central deflecting mirror.

Mechanical switching and retraction means enable the change from daytime observation to night observation and vice versa. They are constituted by a ring that is mounted rotationally on the central body and is capable of being also shifted in translation so that, by means of an internal steering gear, it communicates an appropriate rotation, to the lateral reflection mirrors, to intercept the light beams coming from the night observation optical means and direct them towards the eyepiece means in the lateral bodies in night observation, and to retract these mirrors, thus enabling a direct passage of the light rays coming from the objective means in daytime observation.

By reverse translation, these means also enable the appropriate positioning of said mirrors and the energizing of the intensifier tube.

The invention is also noteworthy for the following points:

the steering gear for the control of each mirror is constituted by a transmission bar provided, at one end, with a projecting point snapped into a peripheral groove of the ring capable of driving the transmission bar in translation without preventing the rotation of the ring and an end toe engaging with a corresponding notch on a disk;

the mirrors are mounted directly on the disks;

the disks engage with structures driving mirrors, fixedly joined to them, in a pivoting motion;

the disks are acted upon, in the locked position, by elastic means, for example springs;

the mechanical means are activated automatically the ring has an internal threaded structure that engages with a corresponding structure of the body so that during rotation, it can impart an appropriate translation to the control rods;

the optical means enabling daytime observation include means to turn over the image, for example systems using Porro prisms, Péchan-Schmidt prisms or any system enabling appropriate turning over daytime vision binoculars.

BRIEF DESCRIPTION OF THE DRAWINGS

Other advantages and features of the will appear from the following non-restrictive description of preferred embodiments of the invention, made with reference to the appended drawings, of which.

DETAILED DESCRIPTION OF THE INVENTION

Figure 1:
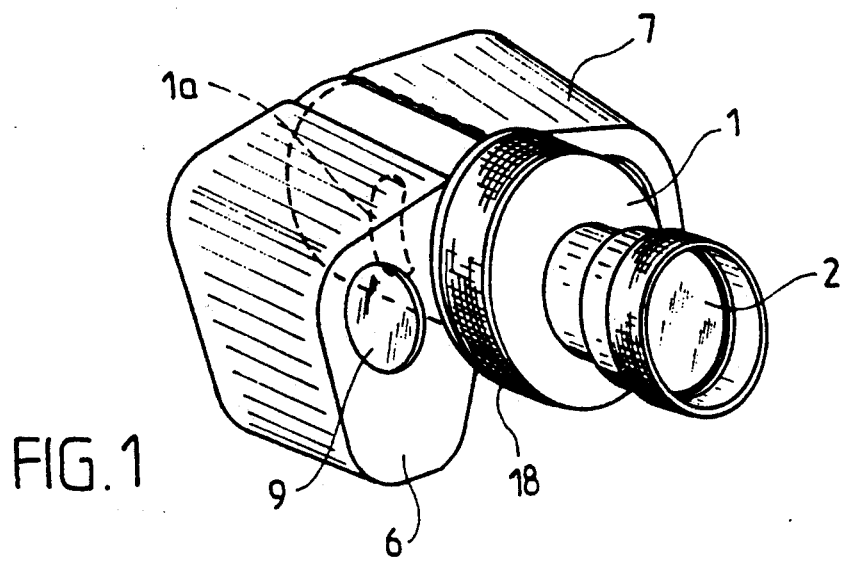
FIG. 1A is a view in perspective of the day-and-night observation device of the present invention.
FIG. 1B illustrates the cooperation between the central body 1 and lateral bodies 6, 7 of the device of FIG. 1.
Figure 2:
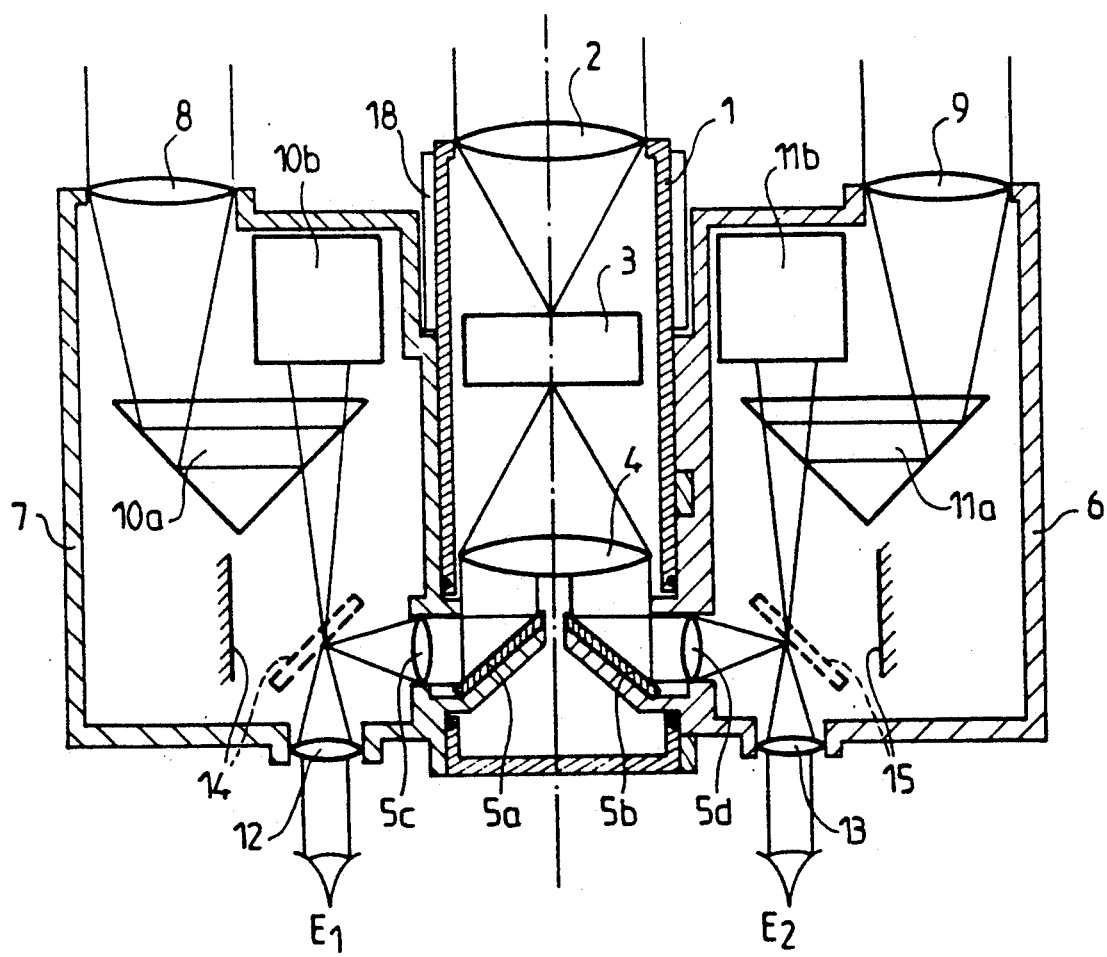
FIG. 2 is a schematic view of the arrangement of the various elements within the device of FIG. 1, according to a first embodiment.
Figure 1A:
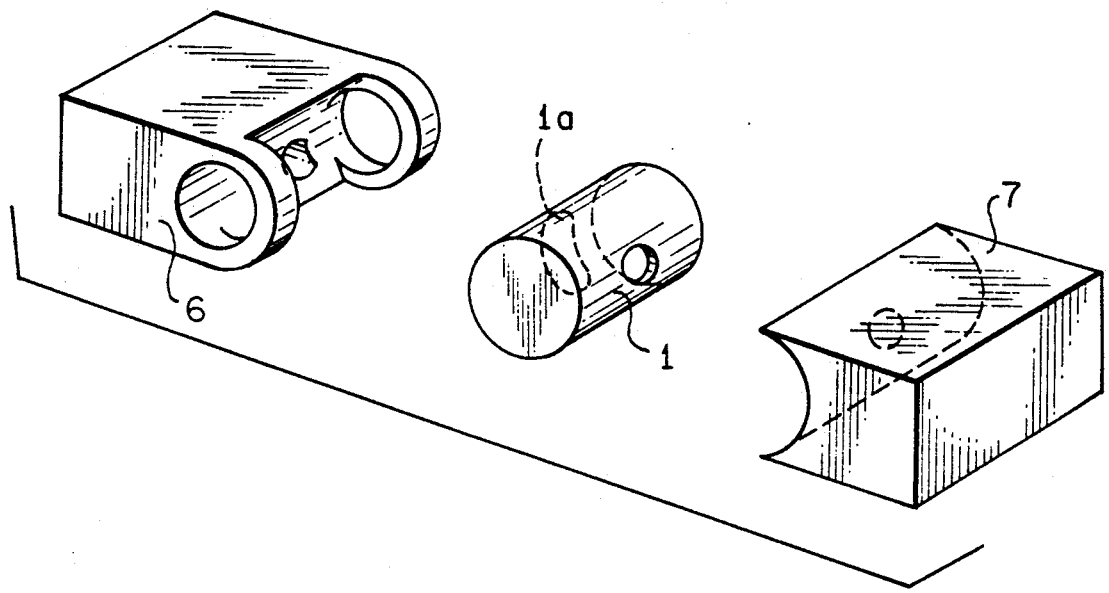

As shown in FIG. 1, the optical device according to the present invention has a central body 1 that receives the night objective 2 and, as shown in figure 2, the intensifier tube 3 and the collimator 4. On each side of the central body 1, there is provision for two lateral bodies 6 and 7, each including an objective 8, 9, a device with Porro prisms 10a, 10b; 11a, 11b, an ocular device 12, 13, a lateral reflection mirror 14, 15, a focusing unit 5c, 5d, a central reflection mirror 5a, 5b. The body 6 is mounted so as to be pivoting on the body 1, while the body 7 is fixedly joined to the body 1. This choice is not an absolutely vital one: it is possible to envisage a reverse arrangement with respect to the axis of the central body 1, in achieving the inter-pupil adjustment in the same way. To enable the inter-pupil adjustment, the central body 1 is provided with an oblong hole 1a (shown in dashes in FIG. 1, as well as in FIG. 1B) cooperating with a substantially circular hole, as shown, for example, in FIG. 1A provided on the lateral body 6. Stops (not shown in the drawings) make it possible to limit the rotation of the body 6, with respect to the body 1, to an angle of about 45°.

The sealing of this equipment is ensured at this level, between the central body 1 and the lateral body 6, by an O-ring placed in a groove surrounding the oblong hole 1a, on which there slides that portion of the cylindrical surface of the lateral body 6 which is in contact with the cylindrical central body 1.

The mirrors 14, 15 are retractable so that in the active position (shown in dashes) they provide for night vision and in the other, retracted position (in solid lines) they provide for daytime vision, then enabling the direct passage of the light beams, coming from the rectifier prisms 10a, 10b, 11a, 11b towards the eyepieces 12, 13.

Figure 3:
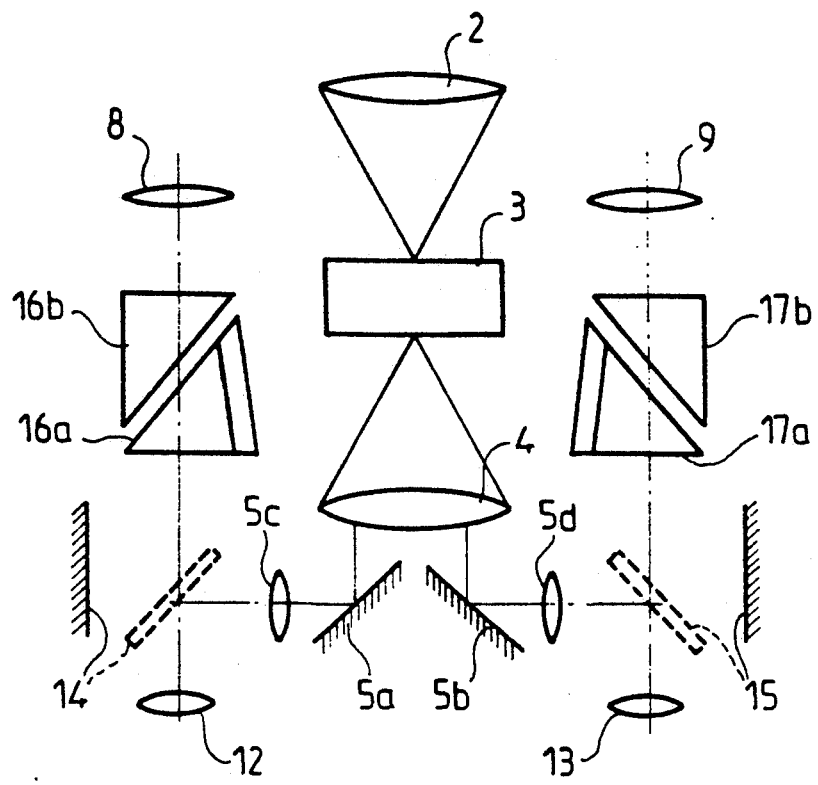
FIG. 3 is a schematic view of the constituent elements of the optical device of FIG. 1, according to a second embodiment.

In the embodiment of FIG. 3, the same constituent elements as those of the device of FIG. 2 are shown, except that the devices with Porro prisms 10a, 10b and 11a, 11b are replaced by Péchan-Schmidt prism devices 16a, 16b and 17a, 17b. It is clear that other embodiments using prisms or other means of turning over the image may be used in the optical device according to the present invention.

Figure 4B:
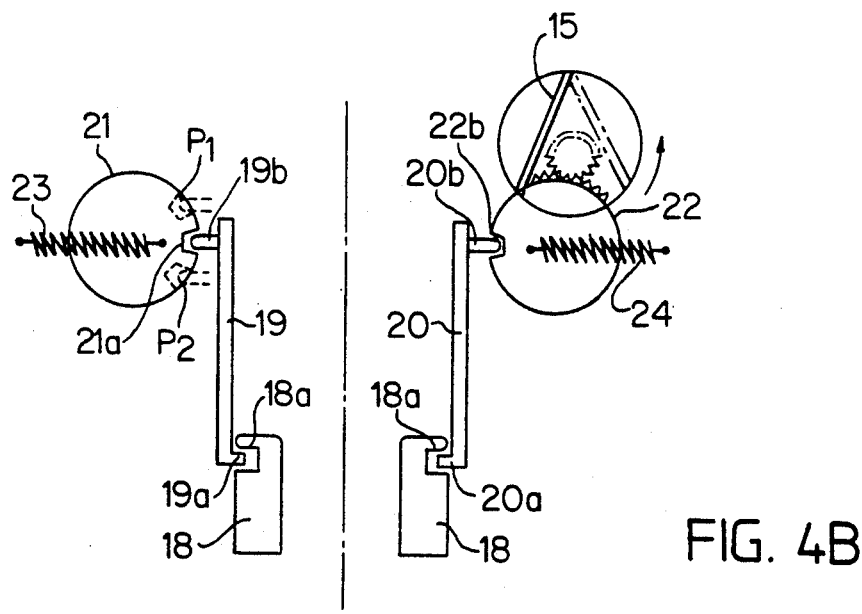
FIG. 4B illustrates an alternative structure for controlling movement of mirrors 14,15.
Figure 4A:
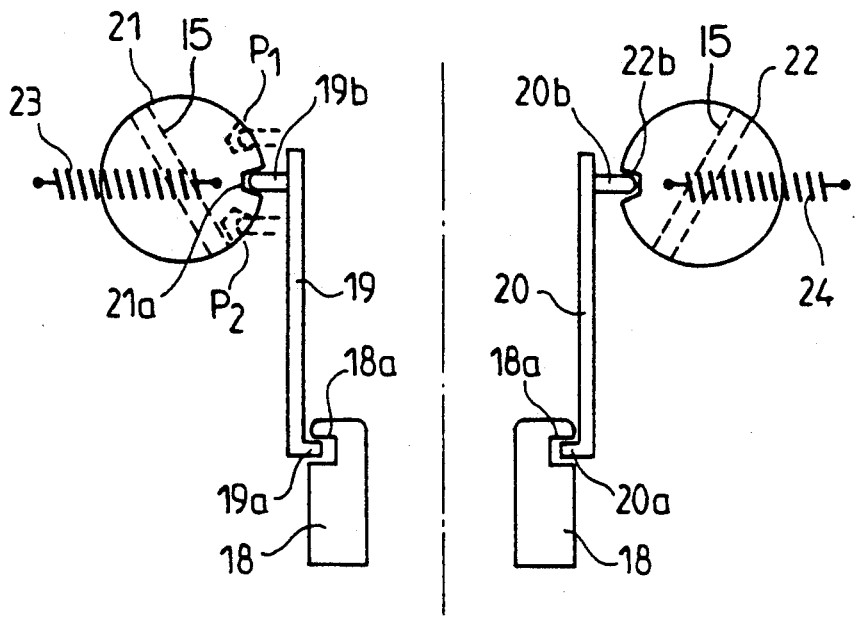
FIG. 4A is a schematic view of the mechanical means enabling the retraction, by rotation, of the system of movable reflection mirrors.

FIG. 4A shows the device enabling the retraction of the mirrors 14, 15. This device includes a ring 18 having an external peripheral groove 18a in which the end projecting points 19a, 20a of the corresponding rods 19, 20 are received. The other end region of these rods 19, 20 bears toes 19b, 20b, the free end of which is engaged with a hollow structure 21a, 22b made in the periphery of the disks 21, 22 which are respectively acted upon in the snap-in positions, shown in dashes, by the action of a spring 23, 24 respectively as a function of the translational motions of the rods 19, 20.

The optical device according to the present invention can work according to the daytime and night optical channels as follows:

As shown in FIG. 2, when the mirrors 14 and 15 are positioned as shown in dashes, the light beam, having crossed the objective 2 and having then been intensified in the tube 3, reaches a collimator 4 where it is divided by a system of mirrors 5a, 5b. The beams resulting from this division are then respectively processed by the focusing units 5c, 5d and then reach the mirrors 14 and 15 which direct them through the eyepiece devices 12, 13 up to the observer's eyes shown at $E_1$, $E_2$. In this translational position of the ring 18, the tube 3 is obviously energized, for example by a microswitch placed in the vicinity of one of the disks 21 or 22, on which a flat feature is or will be made locally, providing for the closing of the microswitch for the position of the disk in night operation. It is seen that this position of the mirrors 14, 15, shown in dashes, conceals the photon beams coming from the objectives 8, 9 and going through the devices with Porro prisms 10a, 10b and 11a, 11b or else the devices with Péchan-Schmidt prisms 16a, 16b and 17a, 17b towards the respective eyepieces 12, 13.

If a change to the daytime viewing position has to be made, then the ring 18 is subjected to a translational motion opposite the one needed for the positioning in night observation, so that the respective mirrors 14, 15 get positioned as shown in solid lines in FIG. 2. These mirrors 14 and 15 are mounted appropriately on the disks 21 and 22 or else on pivoting structures, such as is shown in FIG. 4B engaged respectively with the disks 21 and 22. The position of the disks shown in FIG. 4B is an intermediate position in which the disk may be snapped in by the action of the corresponding springs 23 or 24 in the positions $P_1$ and $P_2$ shown, by way of indication, in dashes in the figure. It is seen that, by means of the projecting points 19a, 20a of the corresponding actuation rods 19, 20 which engage with the disks 21, 22 by means of toes 19b, 20b, the motion of the ring 18 communicates a rotational motion to said disks making them assume, under the action of the springs 23 and 24, the above-mentioned positions $P_1$ and $P_2$ which correspond to a retraction or else to a repositioning of the mirrors 14 and 15 respectively.

Thus, according to the present invention, a certain number of commands and adjustments during use are resolved. These commands and settings can be achieved easily, even if the observer wears very thick gloves. For example the inter-pupil setting is made by the angular positioning of the lateral binocular body 6 in relation to the central body 1, thus enabling a very precise adjustment that is indispensable in daytime vision owing to the small size of the output pupils;

the respective focusings of the night objectives and of the eyepieces are done by rotation of the notched rubber rings linked to these eyepieces;

the day/night switching as well as the lighting of the infrared diode, designed for auxiliary illumination are respectively achieved by translation and rotation of the notched ring 18, independently of the relative angular position of the lateral bodies corresponding to a given inter-pupil setting.

It is clear that the invention is in no way restricted to the embodiments described here above with reference to the appended drawings, but that it encompasses every modification and variant within the scope of those skilled in the art. It is thus possible to achieve a concomitant rotation and translation of the ring 18 by a concomitant threading of the internal surface of said ring 18 and of the supporting surface of the body 1. In the same way, it is also possible to envisage the incorporation of a mini-motor that is controlled by a photoelectric cell and enables the rotational motions of the disks bearing the mirrors 14 and 15 as a function of the ambient luminosity. The binocular body may moreover be made out of any material meeting the mechanical requirements and the requirements of resistance to chemicals and to atmospheric influences to which the optical device of the invention may be subjected. The invention has all sorts of applications (police, customs, guard duties etc.). It can also be applied to military purposes, and the day-and-night optical observation device may be fixed by adequate strapping means to an infantryman's helmet.

What is claimed is:

1. A binocular-type optical device enabling observation by day as well as by night, comprising:

a night vision optical device including an objective lens means, image intensifier tube and optical collimator for forming an optical path for night viewing, said optical path being enclosed within a central body and being aligned with a longitudinal axis of said central body, said central body including an oblong hole on one side and a circular hole on the opposite side thereof, and said central body further enclosing means for splitting and folding said optical path to exit said circular and oblong holes;

a first lateral body fixed to the central body, and a second lateral body pivotally mounted to the central body, each of lateral bodies having a hole aligned with one of said holes in the central body, the pivotally mounted lateral body having the hole formed therein aligned with the oblong hole formed in the central body, each of said lateral bodies including a day vision optical system having an objective at one end and an eyepiece at another end, said day vision optical system having an optical path intersecting the axis of said folded optical path exiting said holes, and including a mirror positionable for deflecting said folded night vision optical path into a respective eyepiece to permit night vision viewing and positionable to permit day vision viewing through said respective eyepiece; and mechanical switching means for changing each of said mirrors from a day viewing position to a night viewing position.

2. A device according to claim 1, wherein the mechanical switching means for changing each of said mirrors from a day viewing position to a night viewing position are constituted by a ring that is mounted on the central body of the optical device and is shifted in translation to effect an appropriate rotation through a central steering gear connected to each mirror, positioning said mirror in a first position to provide for night vision and positioning said mirror in a second retracted position enabling daytime vision.

3. A device according to claim 2, wherein the steering gear for the control of each mirror is constituted by a transmission bar provided, at one end, with a projecting point snapped into a peripheral groove of the ring and an end toe engaging with a corresponding notch on a disk coupled to each mirror.

4. A device according to claim 3, wherein the mirrors are mounted directly on the disks.

5. A device according to claim 3, wherein the disks engage mirror driving means for rotating the mirrors about respective axes, in response to rotation of the disks.

6. A device according to any of the claims 3 to 5, wherein the disks are acted upon, in the locked position, by elastic means.

7. A device according to claim 1, wherein the day vision optical system for enabling daytime observation includes means to turn over an image.

* * * * *